(12) United States Patent
Lee

(10) Patent No.: US 12,486,863 B2
(45) Date of Patent: Dec. 2, 2025

(54) FURNITURE CONNECTOR

(71) Applicant: Rove Concepts Ltd., Vancouver (CA)

(72) Inventor: Art Lee, Vancouver (CA)

(73) Assignee: Rove Concepts Ltd., Vancouver (CA)

( * ) Notice: Subject to any disclaimer, the term of this patent is extended or adjusted under 35 U.S.C. 154(b) by 224 days.

(21) Appl. No.: 18/237,172

(22) Filed: Aug. 23, 2023

(65) Prior Publication Data
US 2025/0067295 A1    Feb. 27, 2025

(51) Int. Cl.
| | |
|---|---|
| A47C 4/02 | (2006.01) |
| A47C 4/03 | (2006.01) |
| A47C 13/00 | (2006.01) |
| A47C 17/04 | (2006.01) |
| F16B 5/06 | (2006.01) |
| F16B 12/24 | (2006.01) |

(52) U.S. Cl.
CPC ............. *F16B 12/24* (2013.01); *A47C 4/02* (2013.01); *A47C 4/028* (2013.01); *A47C 4/03* (2013.01); *A47C 13/005* (2013.01); *A47C 17/04* (2013.01); *F16B 5/0621* (2013.01)

(58) Field of Classification Search
CPC .. A47C 4/02; A47C 4/028; A47C 4/03; A47C 13/005; A47C 17/04; F16B 5/0088; F16B 5/0621; F16B 12/24
See application file for complete search history.

(56) References Cited

U.S. PATENT DOCUMENTS

| | | | | |
|---|---|---|---|---|
| 3,826,206 A | * | 7/1974 | Ruggles | A47C 4/02 |
| | | | | 411/517 |
| 3,841,701 A | * | 10/1974 | Sullivan | A47C 1/124 |
| | | | | 297/248 X |
| 4,077,666 A | * | 3/1978 | Heumann | A47C 13/005 |
| | | | | 297/440.14 X |
| 5,492,399 A | * | 2/1996 | Tillack | A47B 87/0253 |
| | | | | 312/111 |
| 6,345,925 B1 | * | 2/2002 | Coleman | F16B 35/047 |
| | | | | 403/306 X |
| 8,528,972 B2 | * | 9/2013 | Johnsson | A47C 4/02 |
| | | | | 297/440.14 X |
| 8,783,778 B2 | * | 7/2014 | Nelson | A47C 13/005 |
| | | | | 297/440.14 X |
| 9,277,826 B2 | * | 3/2016 | Nelson | A47C 3/029 |
| 10,123,623 B2 | * | 11/2018 | Nelson | A47C 17/045 |
| 10,154,733 B2 | * | 12/2018 | Nelson | F16B 1/00 |

(Continued)

FOREIGN PATENT DOCUMENTS

| | | |
|---|---|---|
| AT | 381847 B | 5/1986 |
| CN | 111742153 A | 10/2020 |

(Continued)

*Primary Examiner* — Rodney B White
(74) *Attorney, Agent, or Firm* — Dentons Durham Jones Pinegar; Lilly Godfrey; Sarah W. Matthews

(57) ABSTRACT

This disclosure relates generally to modular furniture and connectors for modular furniture. A connector for modular furniture may include a substantially U-shaped core having a first prong and a second prong, a first extension disposed about the first prong, and a second extension disposed about the second prong. The connector may be configured to attach a first furniture piece to a second furniture piece. The connector may be capable of being legs for the modular furniture, the first furniture piece, and/or the second furniture piece.

17 Claims, 19 Drawing Sheets

(56) References Cited

U.S. PATENT DOCUMENTS

| | | | |
|---|---|---|---|
| 10,724,564 B2 | 7/2020 | Derelöv | |
| 10,806,261 B2 * | 10/2020 | Nelson | A47C 15/002 |
| 11,253,073 B2 * | 2/2022 | Nelson | A47C 7/20 |
| 11,378,117 B1 * | 7/2022 | Galjour | A47C 17/86 |
| 11,457,745 B1 * | 10/2022 | Clabots | A47C 13/005 |
| 11,882,939 B2 * | 1/2024 | Gansow | A47C 31/02 |
| 12,070,131 B2 * | 8/2024 | Nelson | A47C 4/02 |
| 12,082,705 B2 * | 9/2024 | Eglinton | A47C 13/005 |
| 12,089,744 B2 * | 9/2024 | Zhao | A47D 13/066 |
| 2011/0233976 A1 * | 9/2011 | Hanson | A47C 4/028 |
| | | | 297/440.14 |
| 2020/0187654 A1 | 6/2020 | Mutyala | |
| 2021/0186220 A1 | 6/2021 | Bangalore et al. | |
| 2022/0211183 A1 | 7/2022 | Bangalore et al. | |
| 2024/0108145 A1 * | 4/2024 | Armond | A47C 13/005 |
| 2024/0341487 A1 * | 10/2024 | Checchin | A47C 1/124 |
| 2024/0401624 A1 * | 12/2024 | Phillips | F16B 12/26 |
| 2024/0407550 A1 * | 12/2024 | Nelson | A47C 13/005 |
| 2025/0040712 A1 * | 2/2025 | Eglinton | A47C 4/02 |

FOREIGN PATENT DOCUMENTS

| | | | | |
|---|---|---|---|---|
| DE | 202004008408 U1 * | 9/2004 | | A47C 1/124 |
| DE | 202004014484 U1 * | 1/2005 | | E04F 13/0835 |
| DE | 102005042018 A1 * | 3/2007 | | A47B 83/00 |
| DE | 202011003046 U1 * | 6/2011 | | F16B 12/24 |

* cited by examiner

FURNITURE CONNECTOR

TECHNICAL FIELD

This disclosure relates generally to modular furniture and connectors used with modular furniture systems.

SUMMARY

Disclosed are systems, devices, and/or methods of use thereof regarding modular furniture, modular furniture systems, and modular furniture connectors. In various aspects, disclosed furniture systems can include a first seating element having a cushioned top surface and a plurality of voids disposed on an opposing bottom surface of the first seating element. The furniture systems may also include a support element connectable to the first seating element and having a plurality of voids disposed on a bottom surface of the support element; the support element may be for partially supporting a user resting on the first seating element, such as a back rest, arm rest, ottoman, etc. Additionally, furniture systems may include a connector for connecting the first seating element and the support element. The connector may include a substantially U-shaped inner core having a first prong in connection with to a second prong, a first projection disposed about the first prong, and a second projection disposed about the second prong.

The first projection may have a first half with a plurality of pins and a channel defined in an inner side of the first half. The first projection may also have a second half with a plurality of apertures for receiving the plurality of pins and a channel defined in an inner side of the second half. The channel of the first half and the channel of the second half together define a conduit for receiving the first prong of the substantially U-shaped inner core. The first projection may further include a cap received by a distal end of the first projection in an assembled state. The second projection may have a first half with a plurality of pins and a channel defined in an inner side of the first half. The second projection may also have a second half with a plurality of apertures for receiving the plurality of pins of the first half and a channel defined in an inner side of the second half. The channel of the first half and the channel of the second half together define a conduit for receiving the second prong of the substantially U-shaped inner core. The second projection may further include a cap received by a distal end of the second projection in an assembled state.

The first projection may be received by one of the plurality of voids of the first seating element and the second projection may be received by a void at a bottom surface of the support element. The first projection may be a first leg for the first seating element and the second projection may be a second leg for the support element.

In some embodiments, a furniture system of the present disclosure includes a first seating element having a cushioned top surface and a plurality of voids disposed on an opposing bottom surface of the first seating element. The furniture systems may also include a support element connectable to the first seating element and having a plurality of voids disposed on a bottom surface of the support element. Additionally, the furniture system may include a connector for connecting the first seating element and the support element. The connector may also function as one or more legs for the first seating element and/or support element. The connector may include an inner core having a first prong and a second prong, a first projection disposed about the first prong, and a second projection disposed about the second prong. The first projection may be received by one of the plurality of voids of the first seating element and the second projection may be received by a void at a bottom surface of the support element. The first and second projections may function as first and second legs for the first seating element and the support element, respectively.

In some embodiments, a connector for modular furniture may include a substantially U-shaped core having a first prong and a second prong, a first extension disposed about the first prong, and a second extension disposed about the second prong. The connector may be configured to attach a first furniture piece to a second furniture piece. The connector may be capable of being legs for the modular furniture, the first furniture piece, and/or the second furniture piece.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Furniture, such as chairs, tables, couches, etc. is typically incorporated into every room of a home. For example, kitchens and dining rooms typically incorporate tables and chairs, while living rooms often incorporate chairs and couches. Often, furniture is included to provide both a function and comfort (e.g., a cushioned seat for chatting with friends). However, furniture is expensive and cumbersome to ship, assemble, and arrange inside a home. Additionally, furniture elements generally cannot be mixed and matched, meaning once an element is compromised (e.g., broken or becomes dirty), the entire furniture piece must be disposed of. This leads to increasing costs for consumers who must replace their furniture, as well as increased waste of furniture in landfills.

Embodiments of the present disclosure address these and other issues with furniture. In various aspects, disclosed furniture systems can include a first seating element having a cushioned top surface and a plurality of voids disposed on an opposing bottom surface of the first seating element. The furniture systems may also include a support element connectable to the first seating element and having a plurality of voids disposed on a bottom surface of the support element; the support element may be for partially support a user resting on the first seating element. Additionally, furniture systems may include a connector for connecting the first seating element and the support element. The connector may include a substantially U-shaped inner core having a first prong connected to a second prong, a first projection disposed about the first prong, and a second projection disposed about the second prong.

Figure 1:
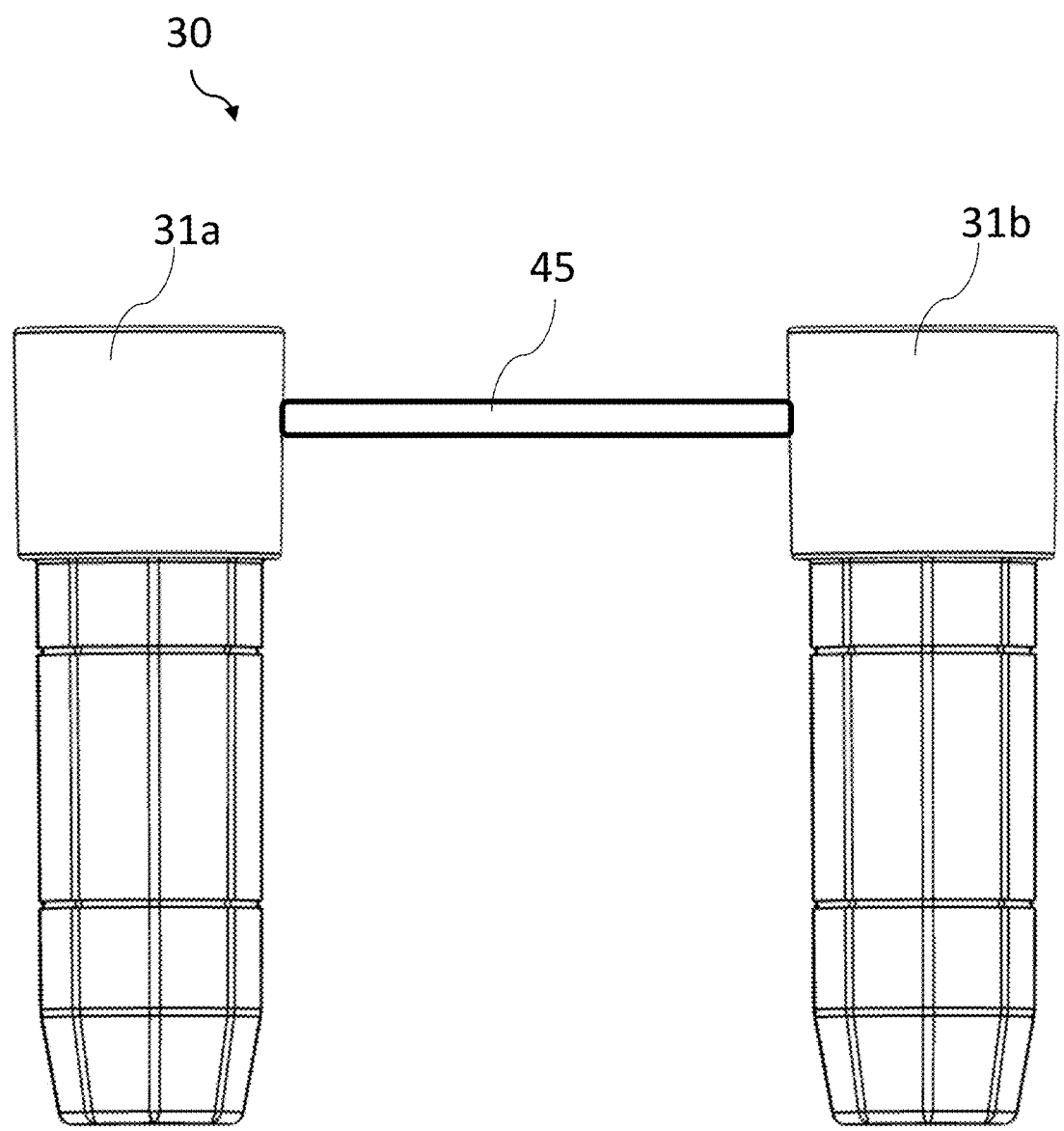
FIG. 1 illustrates a plan view of a connector for modular furniture according to an embodiment of the present disclosure.
Figure 2:
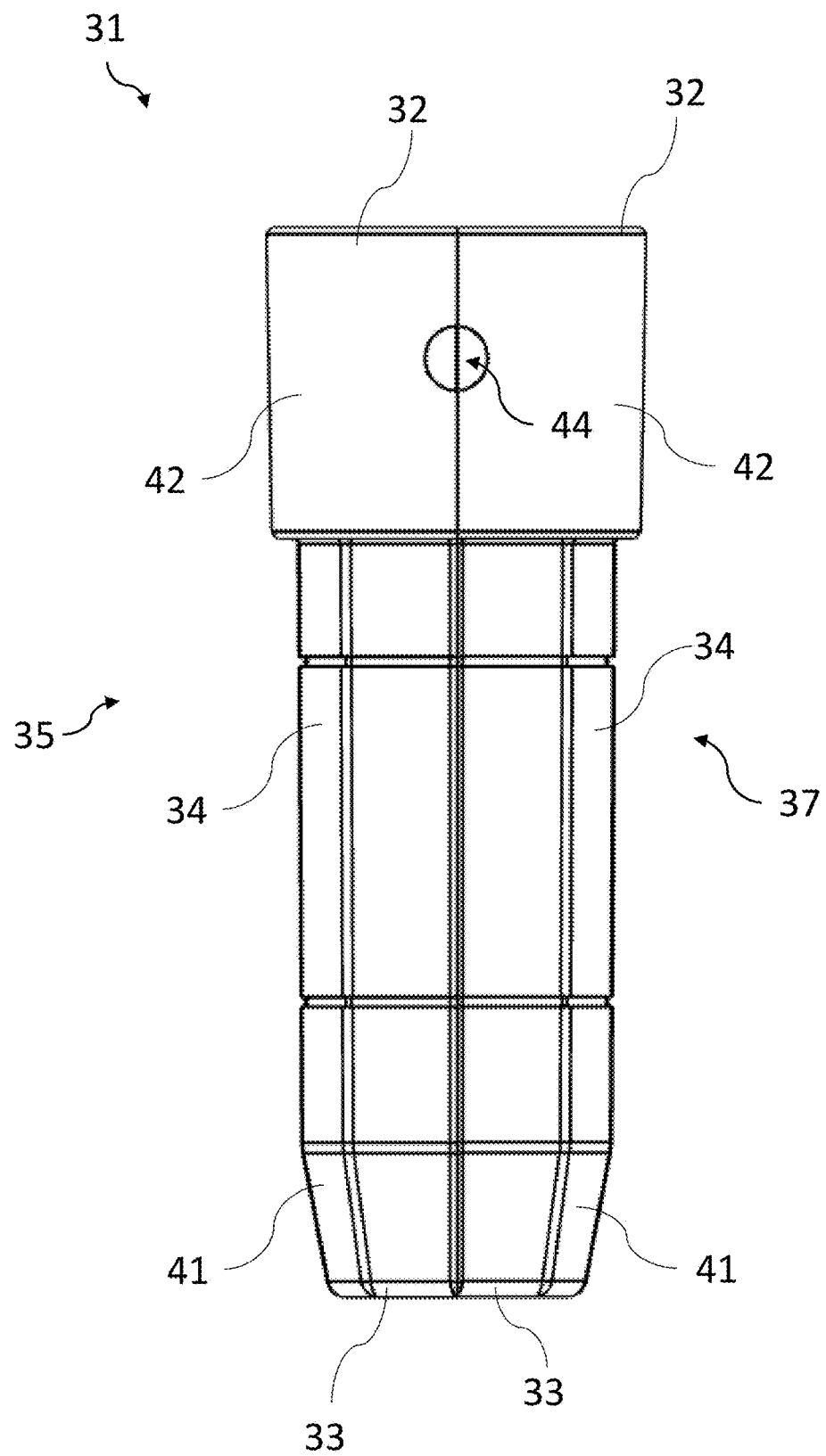
FIG. 2 illustrates a side view of a projection from the connector of FIG. 1.

FIG. 1 illustrates a connector 30 for modular furniture and FIG. 2 illustrates a side view of the projection 31 according to embodiment of the present disclosure. As illustrated in FIG. 1, the connector 30 includes a first projection 31a and a second projection 31b joined by an inner core 45. The projections 31a, 31b may be substantially identical to each other. The connector 30 may be for connecting one or more pieces or elements of furniture together, and/or to function as legs for a piece of furniture. Specifically, as described more fully below, the first projection 31a may be received by a first furniture element and the second projection 31b may be received by a second furniture element. As the inner core 45 connects the first and second projections 31a, 31b, placement of the projections 31a, 31b within the furniture elements thereby connects the furniture elements. Additionally, a portion of the projections 31a, 31b (e.g., a distal end or a cap) functions or serves as legs for the connected furniture elements. That is, a portion of the projections 31a, 31b rests against a surface (e.g., a floor) upon which the furniture elements are positioned. Thus, the connector provides an easy and simple method of connecting furniture elements, while functioning as a component of a furniture system (e.g., legs) comprised of furniture elements.

Referring to FIG. 2, a projection 31 (e.g., projections 31a, 31b) includes a first half 35 and a second half 37, joined together in an assembled state. Each half 35, 37 includes a distal end 32, a proximal end 33 opposite the distal end 32, and a body 34 extending therebetween. Partially extending between the distal end 32 and the body 34 is a stepped portion 42, which may have a diameter greater than a diameter of the body 34. Defined within the stepped portion 42 is an aperture 44, through which a portion of the inner core 45 may extend.

Disposed near the proximal end 33 is a tapered portion 41, where the body 34 narrows as it reaches the proximal end 33. The tapered portion 41 may assist in placing the projection 31 within a void of a furniture element, as described more fully below (see FIGS. 12A-12B). The tapering may also assist in the manufacturing process if the projection 31 is molded.

The projection 31 may have a length ranging from about 165 mm to about 180 mm, such as about 169, 170, 173, 175, 178 mm or a length within a range defined by any two of the foregoing values. The proximal end 33 may have a diameter ranging from about 35 mm to about 50 mm, such as 37, 30, 43, 45, 48 mm, or a diameter within a range defined by any two of the foregoing values. The tapered portion 41 may have a diameter ranging from about 55 to about 65 mm, such as 58, 60, 62, 63 mm, or a diameter within a range defined by any two of the foregoing values. The stepped portion 42 may have a length ranging from about 45 to 55 mm, such as 47, 48, 50, 52, 54 mm, or a length within a range defined by any two of the foregoing values.

Figure 3:
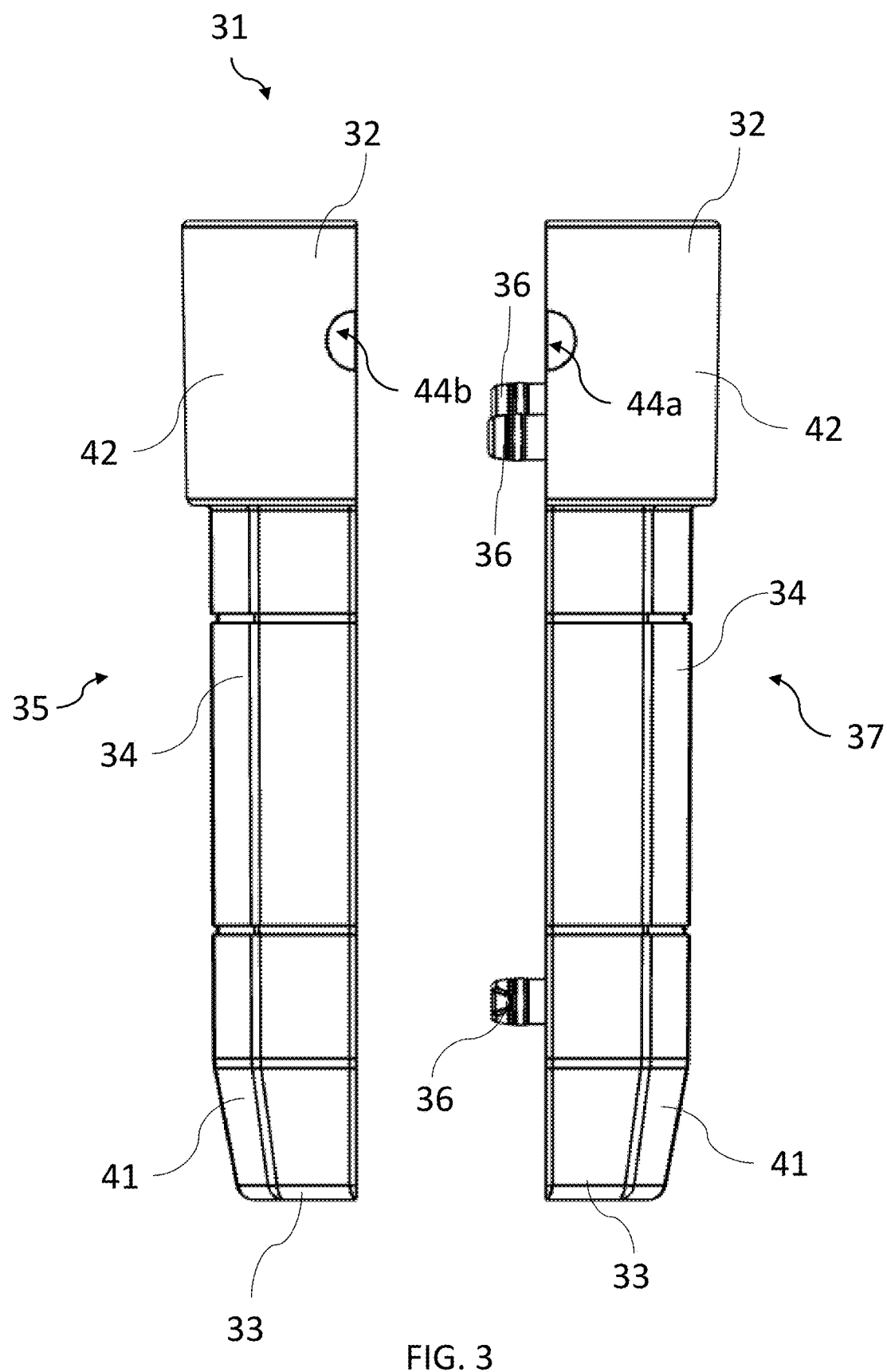
FIG. 3 illustrates an exploded view of a first half and a second half of the projection of FIG. 2.

FIG. 3 illustrates side views of the first half 35 and the second half 37 of the projection 31 of FIG. 2. In other words, FIG. 3 illustrates the projection 31 in a disassembled state. As before, each half 35, 37 includes the distal end 32, the proximal end 33 opposite the distal end 32, and the body 34 extending therebetween. The second half 37 may include one or more (e.g., a plurality) of pins 36 extending from an interior surface that mate with one or more (e.g. a plurality) of voids (not illustrated, see FIGS. 4-5) within the interior surface of the first half 35. Other embodiments may not include pins and/or voids, but may include other means for connecting the two halves. In some embodiments, the means for connecting the two halves allows for tool-less assembly to connect the two halves. Each half 35, 37 may also include a portion of the aperture 44. Specifically, the first half 35 includes a first portion 44b and the second half 37 includes a second portion 44a. When the first half 35 is joined to the second half 37, the two portions 44a, 44b create the aperture 44.

Figure 4:
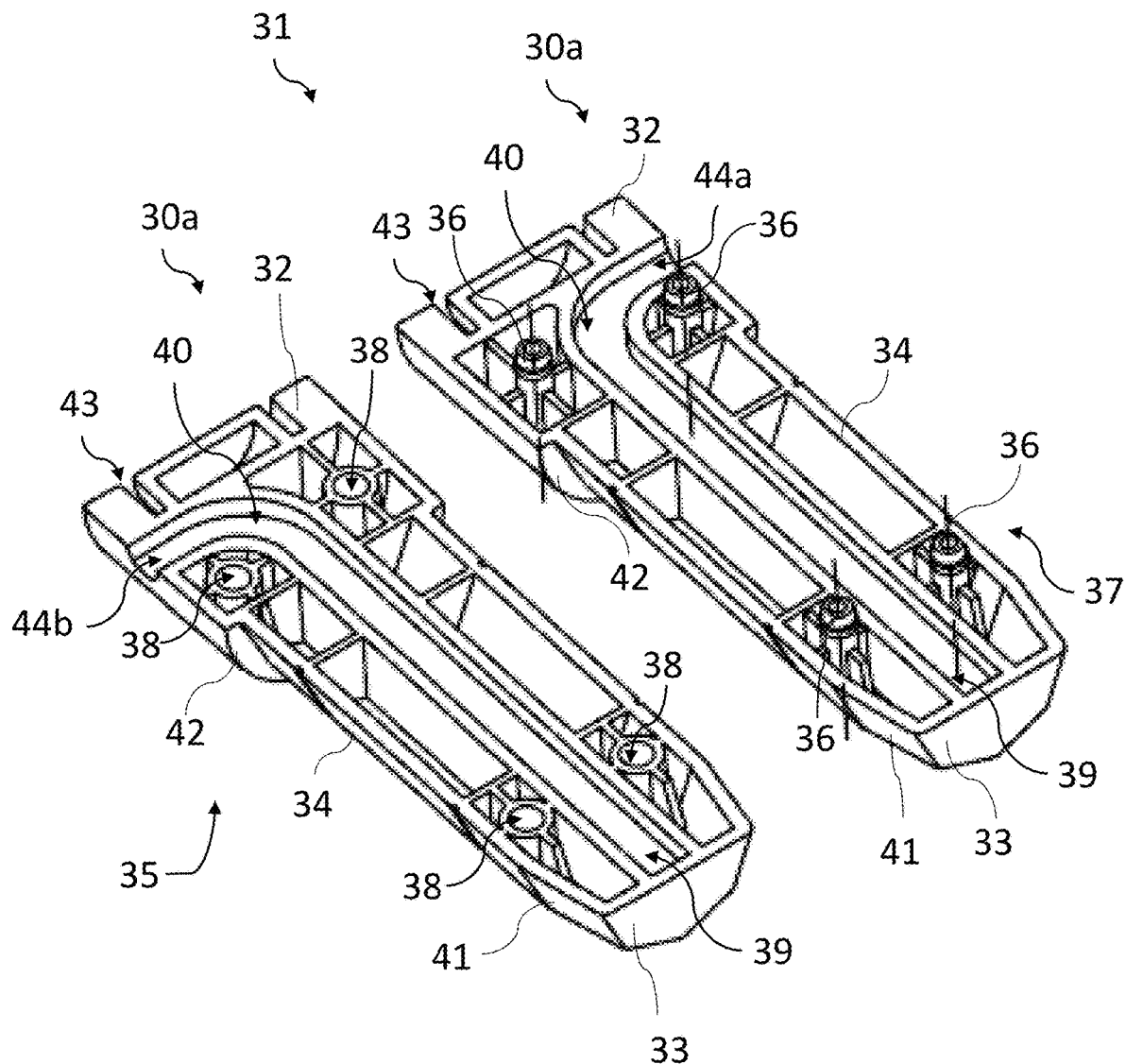
FIG. 4 illustrates a perspective view of the interior of the first and second halves of the projection from FIGS. 1-3.
Figure 5:
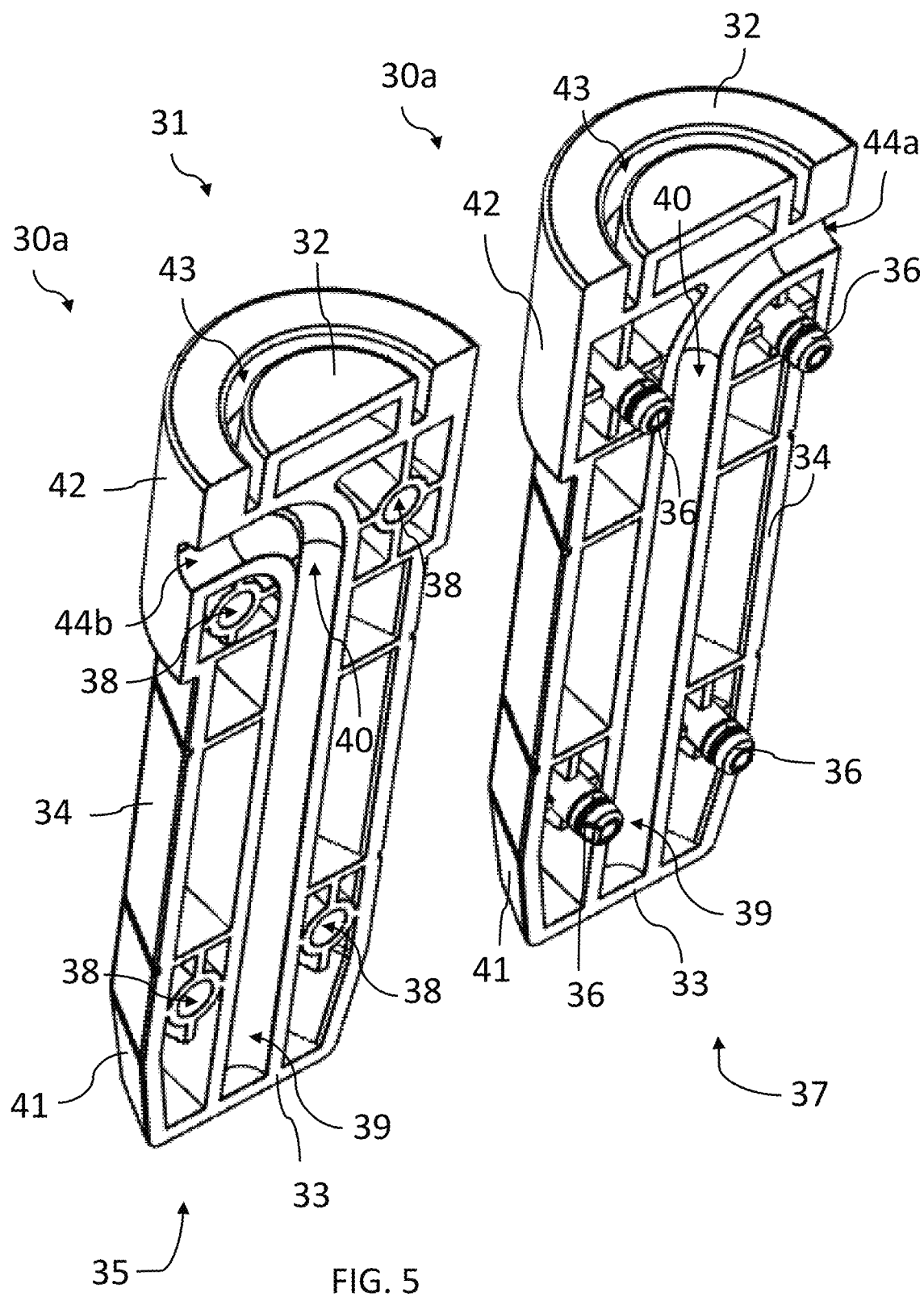
FIG. 5 illustrates a distal perspective view of FIG. 4.

FIG. 4 illustrates a perspective view of the interior of the first and second halves of the projection from FIGS. 1-3 and FIG. 5 illustrates a distal perspective view of FIG. 4. The projection 31 includes the first half 35 and the second half 37 which is joinable to the first half 35 through a plurality of pins 36. Each pin 36 may have a length or extension of about 8 to 12 mm, such as 10 mm, from the inner side 30a of the second half 37. As shown in FIGS. 4-5, the first half 35 includes one or more voids 38 for receiving the one or more pins 36 of the second half 37. Each void 38 may have a diameter sized and shaped to receive the pins 36. The second half 37 may be assembled to the first half 35 through a snap-fit, press-fit, friction-fit, clips, etc. In some embodiments, the pins 36 include barbs or other projections to facilitate a tight fit within the voids 38 of the first half 35. In some embodiments, the first half 35 is irreversibly joined to the second half 37 in an assembled state; in other embodiments, the halves 35, 37 are reversibly joined together and can be easily separated and reassembled as necessary.

The distal end 32 of each half 35, 37 also includes a channel or groove 43. The groove 43 may be for receiving a cap (see cap 50 in FIG. 8). When the halves 35, 37 are joined together in an assembled state, the groove 43 may have a circular shape.

Each half 35, 37 additionally includes a channel 39 defined within an inner side 30a of body 34. The channel 39 of each half 35, 37 is for receiving the inner core 45. For example, as discussed more fully below, a prong of the inner core 45 fits within and is received by the channels 39. Specifically, when the first half 35 is connected to the second half 37, the channels 39 create a conduit for receiving the prong of the inner core 45 and securing the prong within the assembled projection 31.

The channel 39 of each half 35, 37 may extend from the proximal end 33, through the body 34, to a curve 40, which causes the channel 39 to curve through the distal end 32. The channel 39 will meet or merge with the first or second portion 44a, 44b, respectively. When the projection 31 is assembled, the first and second portions 44a, 44b will define the aperture 44, through which a portion of the inner core 45 may extend. The channel 39 may have a width of about 10 to about 14 mm, such as 11, 12, 12.5, 13 mm, or a width within a range defined by any two of the foregoing values.

Figure 6A:
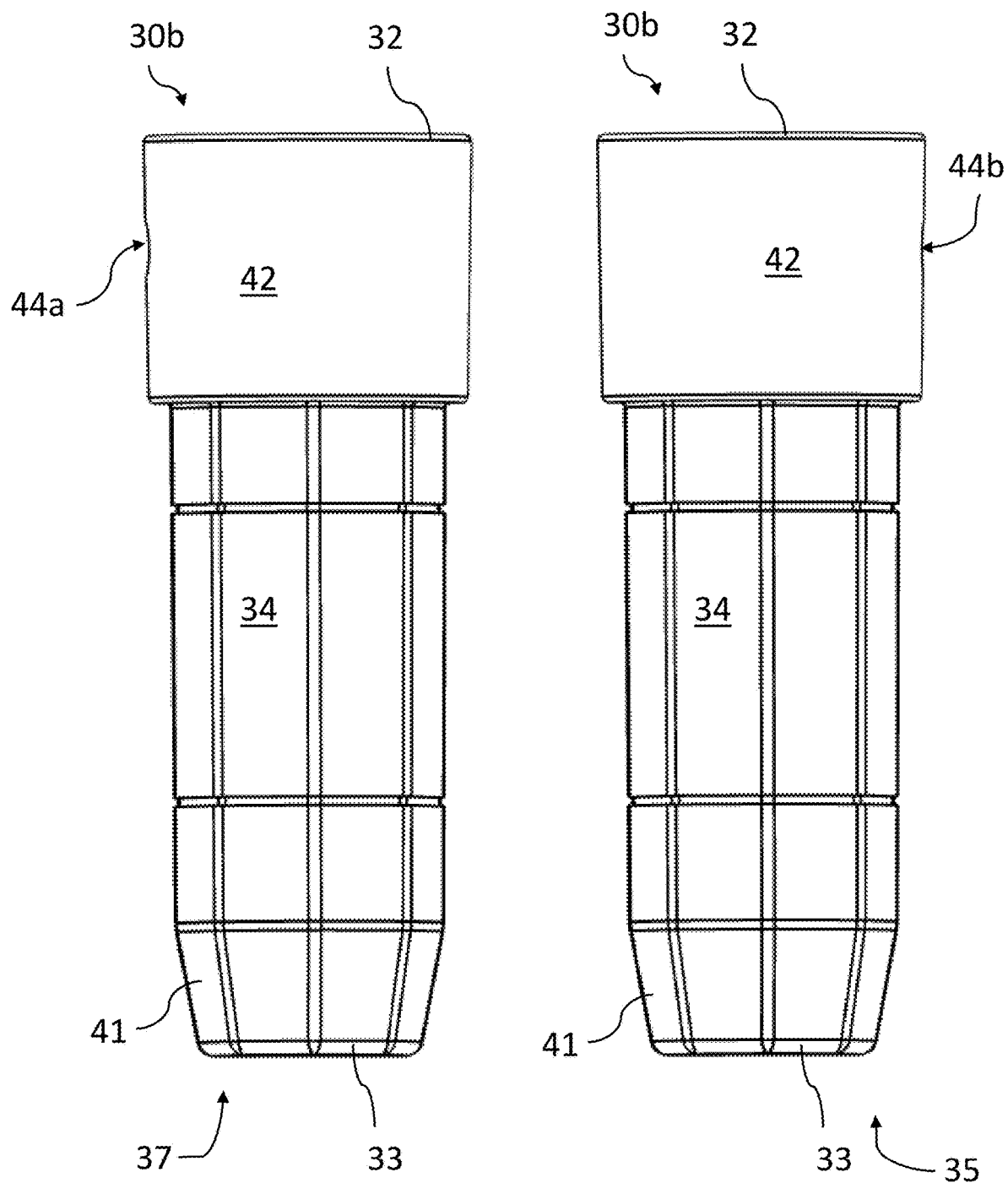
FIG. 6A illustrates the outer side of the first and second halves of FIG. 3.

FIG. 6A illustrates the outer side 30b of the first and second halves 35, 37 of the projection 31. As before, each half 35, 37 includes the distal end 32, the proximal end 33 opposite the distal end 32, and the body 34 extending therebetween. Disposed at or near the distal end 32 is the stepped portion 42. In some embodiments, the stepped portion 42 remains outside of a void of a furniture element that has received an assembled projection 31 (see FIGS. 1-2) and thereby acts as a leg for the furniture element. Additionally, defined in each stepped portion 42 is a portion 44a, 44b of aperture 44. The portions 44a, 44b are continuous with the channel 39 defined on the inner side 30a. Again, in an assembled state, the channels 39 create a conduit for receiving prongs of the inner core 45, where a portion of the inner core 45 extends through aperture 44 to connect two projections 31 to form the connector 30.

Figure 6B:
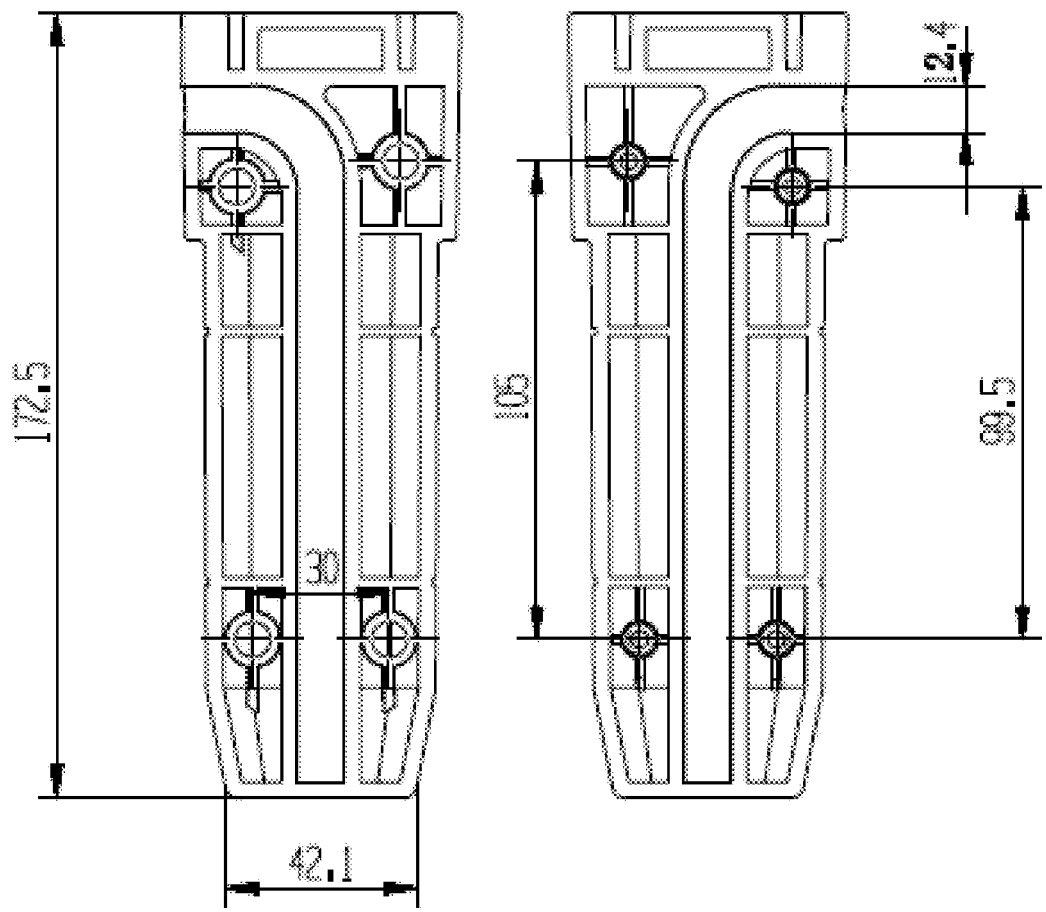
FIG. 6B illustrates the inner side of the first and second halves of FIG. 3.

FIG. 6B illustrates various measurements (in mm) for each half 35, 37 of the projection 31. For example, the pins 36 of the second half 37 may be asymmetrically disposed about the channel 39. As such, a first vertical pair of pins 36 may be distanced apart by about 100 to 110 mm, such as about 105 mm. A second vertical pair of pins 36 may be distanced apart by about 95 to 105 mm, such as about 99.5 mm. Similarly, the voids 38 may be asymmetrically disposed about the channel 39 and distanced from each other to match the spacing of the pins 36.

Figure 7A:
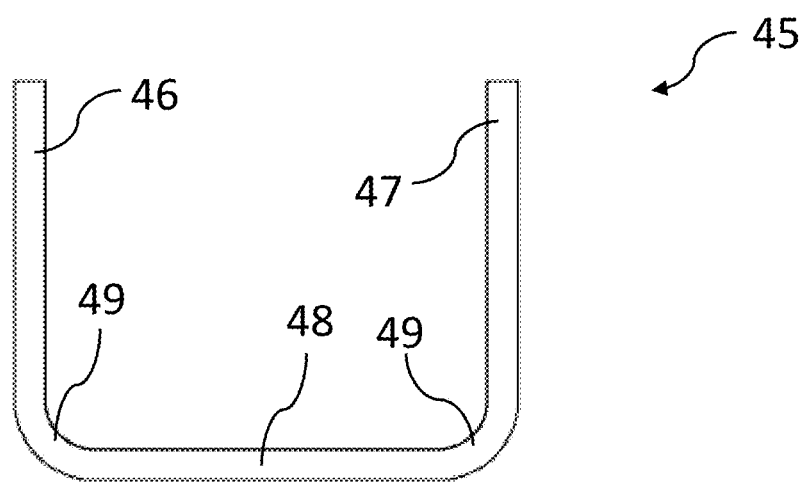
FIGS. 7A-7C illustrate various views of an inner core from the connector of FIG. 1.
Figure 7B:
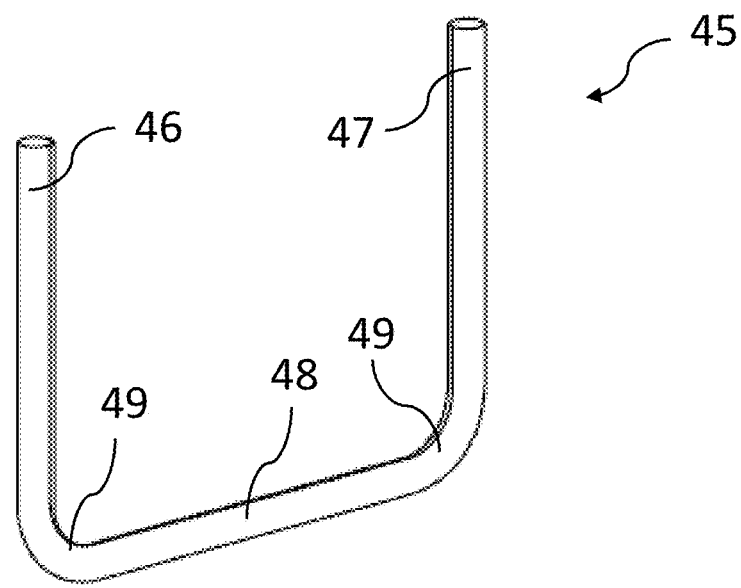
Figure 7C:
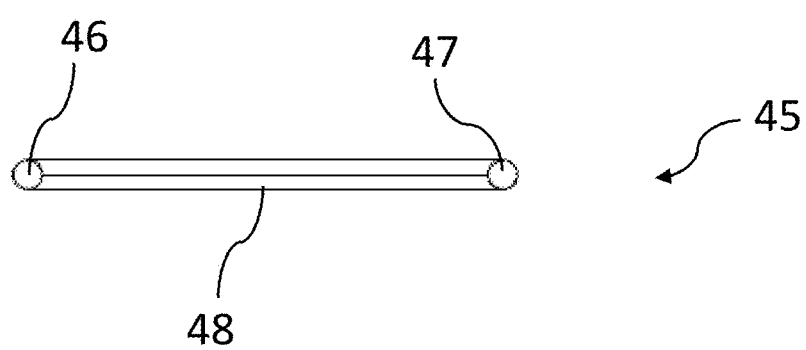

FIGS. 7A-7C illustrate various views of an inner core 45 from the connector 30 of FIG. 1. The inner core 45 may be substantially U-shaped, having a first prong 46 and a second prong 47 joined to the first prong 46 through base 48. The first and second prongs 46, 47 may be joined to the base 48 through curves 49.

As discussed previously, the first and second prongs 46, 47 are configured to be received by a conduit. Specifically, the first prong 46 is to be received by a conduit of a first projection 31a and the second prong 47 is to be receive by a conduit of a second projection 31b. The first and second projections 31a, 31b may be assembled from the first and second halves 35, 37 from FIGS. 3-6. The conduits of the first and second projections 31a, 31b may be defined by the channels 39 within the inner sides 30a of each half 35, 37. The base 48 of the inner core 45 extends between the projections 31a, 31b and thereby connects the projections 31a, 31b. A length of the base 48 (and, thus, a distance between the projections 31a, 31b) may correspond to dimensions of modular furniture elements to be connected by the connector 30. The length may be measured from an outside of the a first curve 49 to an outside of a second curve 49.

In some embodiments, a length of the base 48 ranges from about 190 to 200 mm, such as 192, 195, 197 mm, or a length within a range defined by any two of the foregoing values. Each prong 46, 47 may have a diameter of about 10 to about 14 mm, such as 11, 12, 13 mm, or a diameter within a range defined by any two of the foregoing values. The prongs 46, 47 may be spaced apart by a distance of about 180 to 190 mm, such as 182, 185 mm, or a distanced within a range defined by any two of the foregoing values; the distance may be measured from a center of each prong 46, 47. A distance between a prong 46, 47 and an opposing curve 49 may be about 150 mm.

Figure 8:
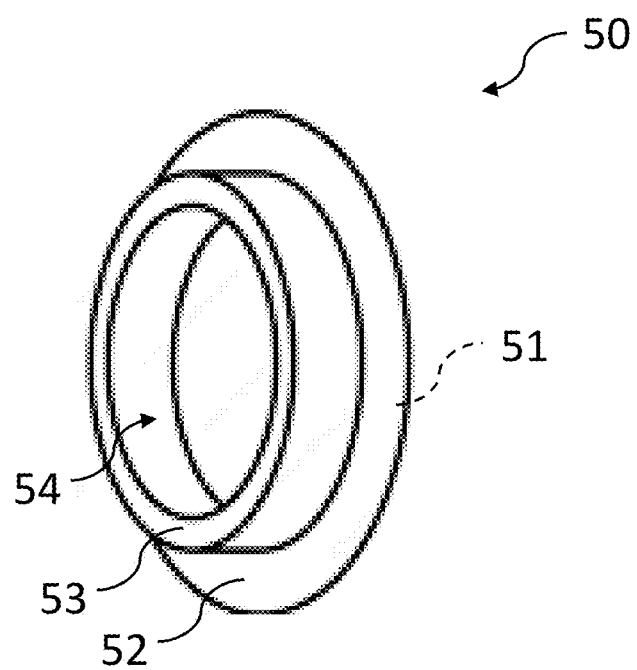
FIG. 8 illustrates a cap used with the connector of FIG. 1.

FIG. 8 illustrates a cap 50 used with the connector 30 of FIG. 1. Specifically, the cap 50 is to be received by the groove 43 defined in the distal end 32 of the projection 31. The cap 50 may include a top surface 51 and an opposing bottom surface 52. Extending from the bottom surface 52 is a flange 53 that defines a cavity 54. The flange 53 may be received by the groove 43 and a portion of the distal end 32 may be received within the cavity 54. The cap 50 may be press-fit, snap, clip, or otherwise fit within groove 43.

As before, the connector 30 and/or the projections 31a, 31b of the connector 30 act as legs for modular furniture or furniture systems. The cap 50 may ultimately rest on a floor or other surface and can assist in preventing sliding of modular furniture or a furniture system. The cap may also assist in keeping the two halves of the projection in connection with each other in an assembled state. In some embodiments, the cap 50 is made from a silicon to provide a frictional force against the floor. In some embodiments, the cap 50 is a plastic or other molded material.

Figure 9:
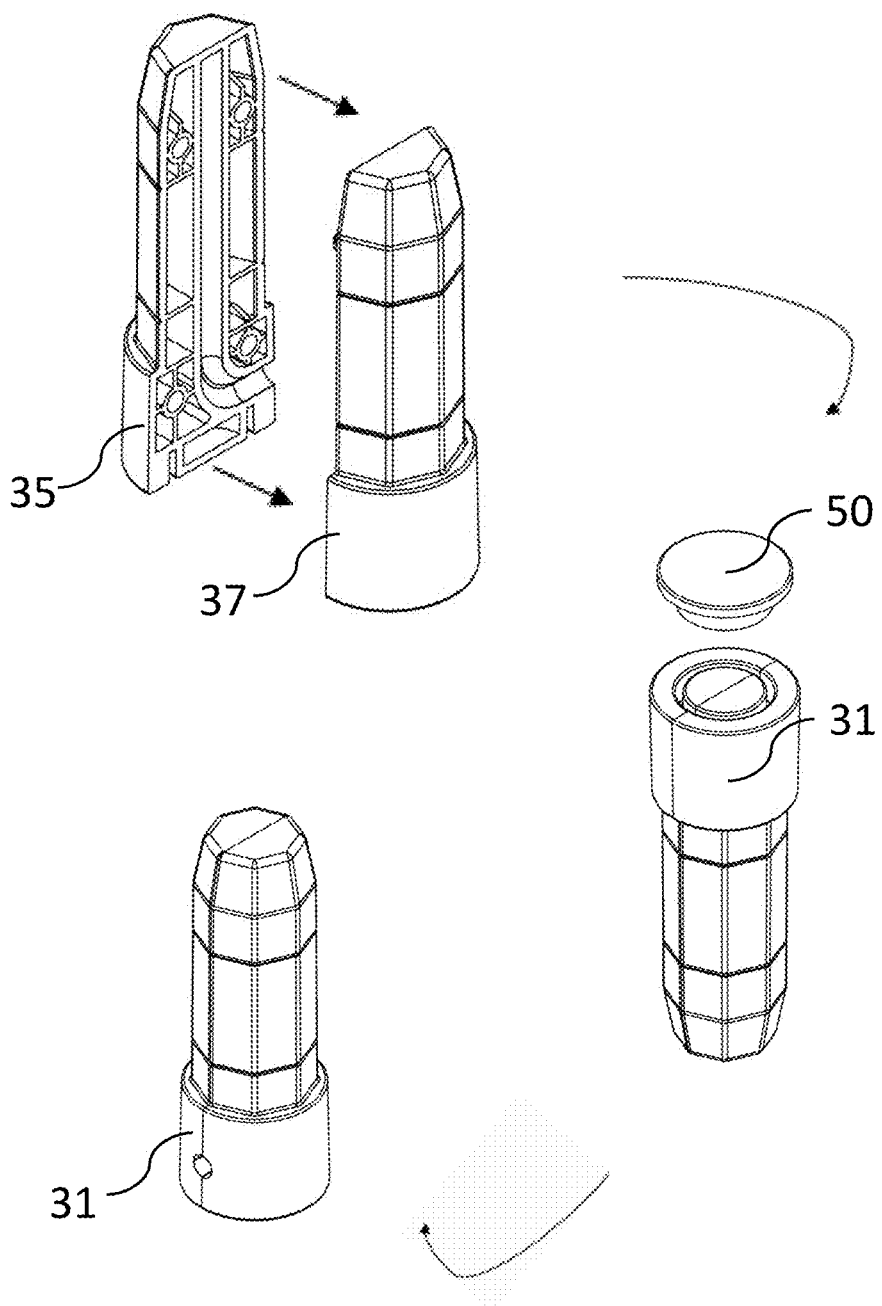
FIG. 9 schematically illustrates assembly of the projection and cap.

FIG. 9 schematically illustrates assembly of the projection 31 and the cap 50. Specifically, to form the projection 31, the first half 35 is joined to the second half 37, such as through pins 36 being received by voids 38 or any other suitable connection method. The halves 35, 37 may be reversibly or irreversibly joined together. Once the projection 31 is assembled, the cap 50 may be connected to the distal end 32 of the projection 31 (e.g., received by groove 43). The projection 31 and the cap 50 can now act or function as a leg for a piece of furniture.

Additionally, and/or alternatively, prior to joining the first and second halves 35, 37, the inner core 45 may be positioned between the halves 35, 37. Specifically, a prong (e.g., first or second prong 46, 47) may be positioned within the channel 39 of the first half 35 and then the second half 37 may be attached to the first half 35, where the channel 39 of the second half 37 is positioned about the prong. The process may then be repeated with a second projection (i.e., a second set of first and second halves 35, 37) and a second prong of the inner core 45. Positioning the inner core 45 between the halves 35, 37 forms the connector 30 of FIG. 1, which can then be used to connect a first furniture element to a second furniture element.

The halves 35, 37 simply need to be snapped or clipped together to assemble the projections 31. Additionally, the halves 35, 37 simply need to be snapped or clipped together around a prong 46, 47 of the inner core 45 to create the connector 30 of FIG. 1. Notably, no tools are required to assemble the connector 30 and, thus, to modularly connect furniture elements together in a furniture system. In other embodiments, tools may be used to connect and/or assemble the connector.

Figure 10:
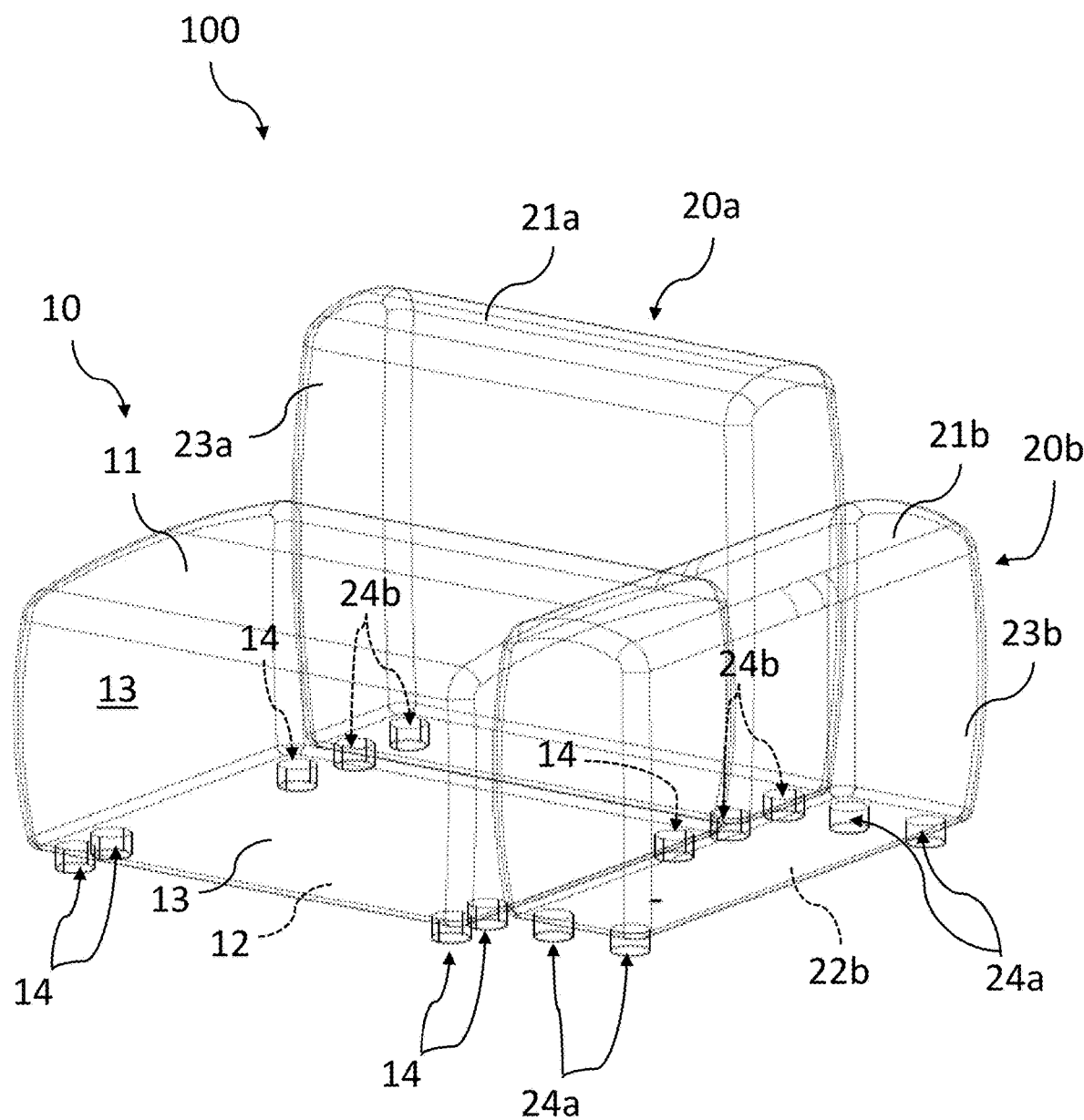
FIG. 10 illustrates a furniture system according to the present disclosure.

FIG. 10 illustrates a furniture system 100 according to the present disclosure, though the connectors 30 have been omitted for clarity of the furniture elements contained within the system 100. As illustrated, the system 100 includes a plurality of modular furniture pieces, such as a furniture element 10 and one or more support elements 20. The furniture element 10 may be a cushioned element (e.g., a seating element) for a user to rest upon when using the furniture system 100. The furniture element 10 includes a top surface 11 which may be a cushioned surface, a bottom surface 12 opposite the top surface 11, and side surfaces 13 extending between the top and bottom surfaces 11, 12. In general, the furniture element 10 has a cuboid shape, such as a cube or rectangular prism shape, though any shape is contemplated herein.

Disposed within or defined by the bottom surface 12 are a plurality of voids 14. Each void of the plurality of voids 14 may be capable of receiving a projection 31 from the connector 30 (not illustrated). To that end, the voids 14 may extend into the bottom surface 12 far enough to accommodate a length of the body 34 of the projection 31, while leaving the stepped portion 42 outside of the void 14. In some embodiments, the stepped portion 42 abuts or rests against a perimeter of the void 14. Thus, the projection 31 and/or the stepped portion 42 may serve as legs for the furniture element 10.

The furniture system 100 also includes one or more support elements 20, such as a first support element 20a and a second support element 20b. Each support element 20a, 20b includes a top surface 21a, 21b, a bottom surface 22a, 22b opposite the top surface 21a, 21b, and side surfaces 23a, 23b extending between the top surface 21a, 21b and the bottom surface 22a, 22b. Similar to the furniture element 10, each support element 20a, 20b includes a plurality of voids 24a, 24b disposed or defined within the bottom surface 22a, 22b. In some embodiments, the support elements 20 may be an arm rest, a back rest, an ottoman, and/or a second furniture element (e.g., a second cushioned seating element).

As with voids 14, each void 24a, 24b is sized and shaped to receive a projection 31 from the connector 30 (not illustrated). To that end, the voids 24a, 24b may extend into the bottom surface 22a, 22b far enough to accommodate a length of the body 34 of the projection 31, while leaving the stepped portion 42 outside of the voids 24a, 24b. In some embodiments, the stepped portion 42 abuts or rests against a perimeter of the voids 24a, 24b. Thus, the projection 31 and/or the stepped portion 42 may serve as legs for the support elements 20a, 20b.

Figure 11A:
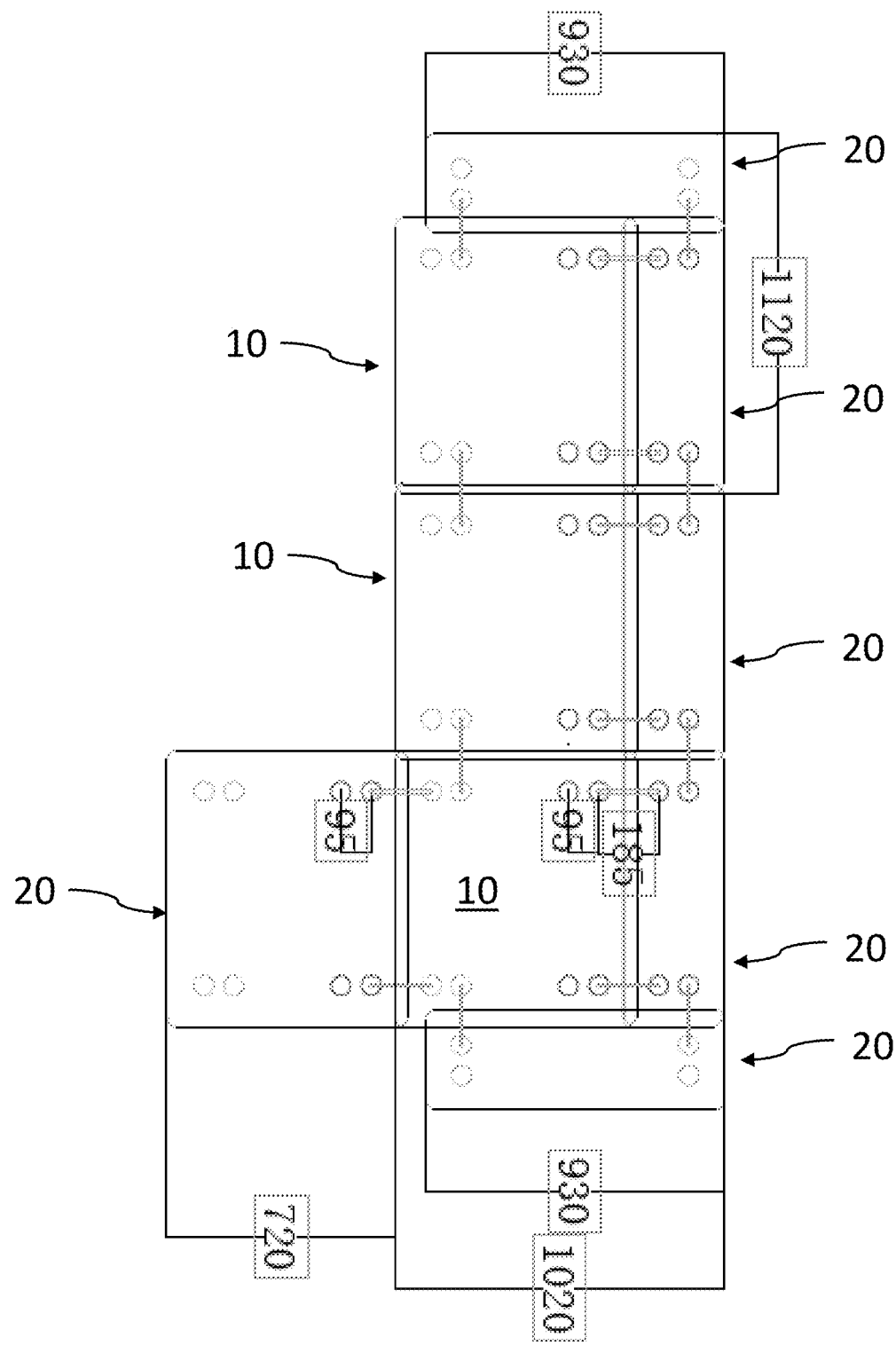
FIGS. 11A-11D illustrate various layouts of a furniture system according to the present disclosure.

FIGS. 11A-11D illustrate various layouts of a furniture system according to the present disclosure. As shown in these figures, the connection between the connectors may be front-back, left-right, etc. due to the modular nature of the design. Specifically illustrated are different configurations of connecting a furniture element 10 and a support element 20 using a connector 30, such as the connector 30 from FIGS. 1-8. Additionally illustrated in FIG. 11A are various measurements (i) of distances between voids within the bottom surfaces of the furniture and/or support elements, (ii) of lengths of the support elements, and (iii) lengths from one end of a first support element to one end of a second support element. For example, a distance between voids 14 of a furniture element 10 may be about 95 mm, while a distance between a first void 14 of the furniture element 10 and a first void 24 of a support element may be about 185 mm.

Figure 11B:
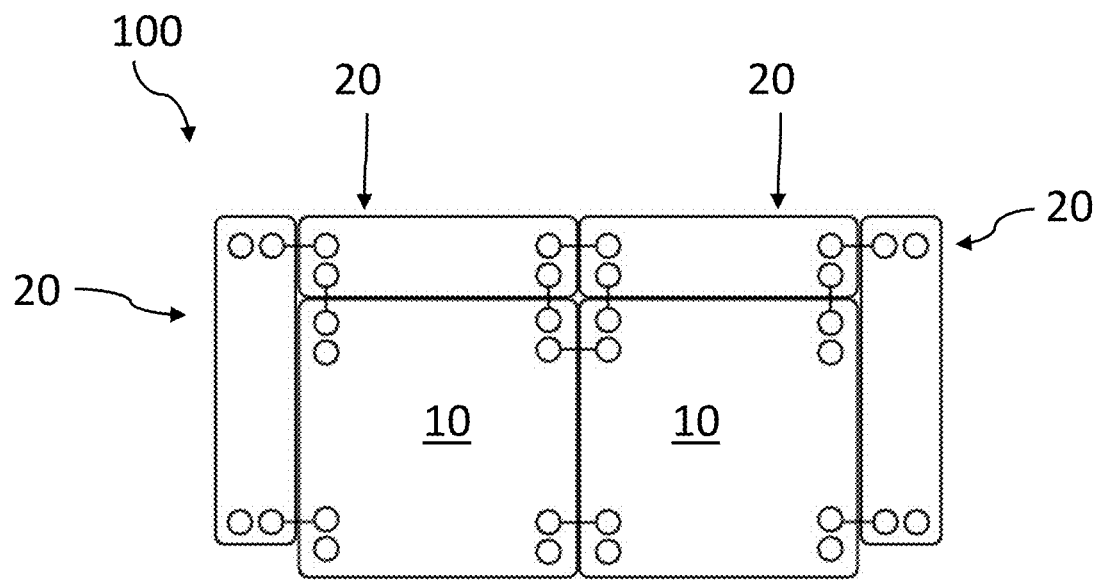
Figure 11C:
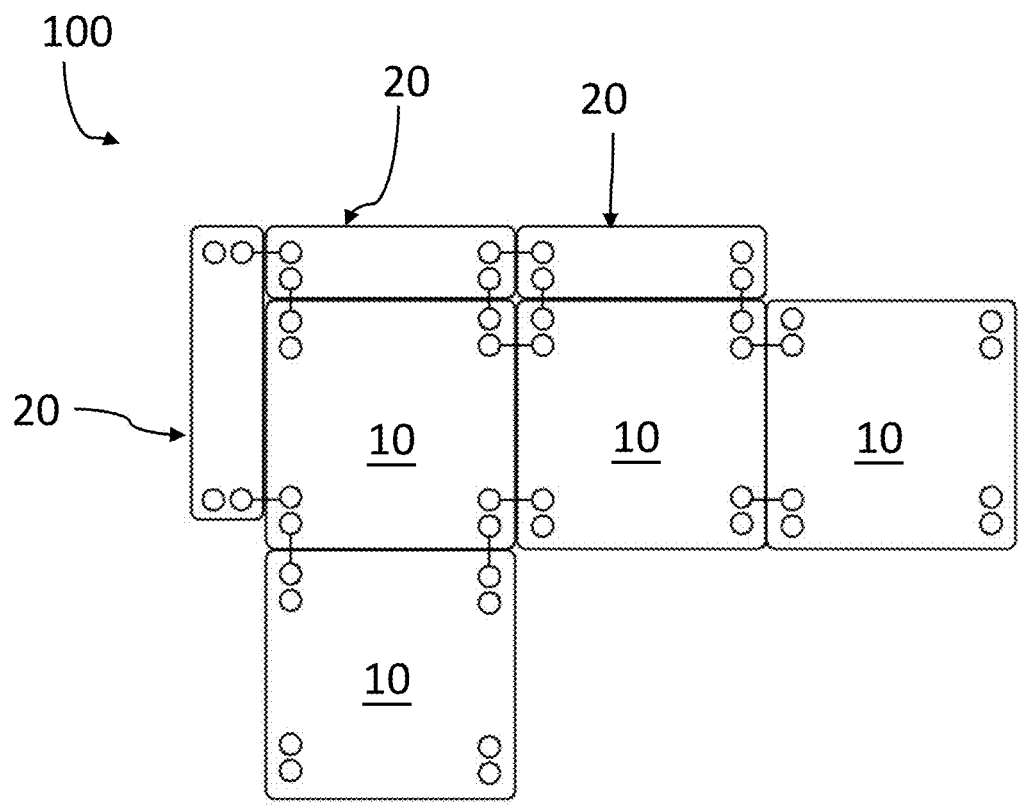
Figure 11D:
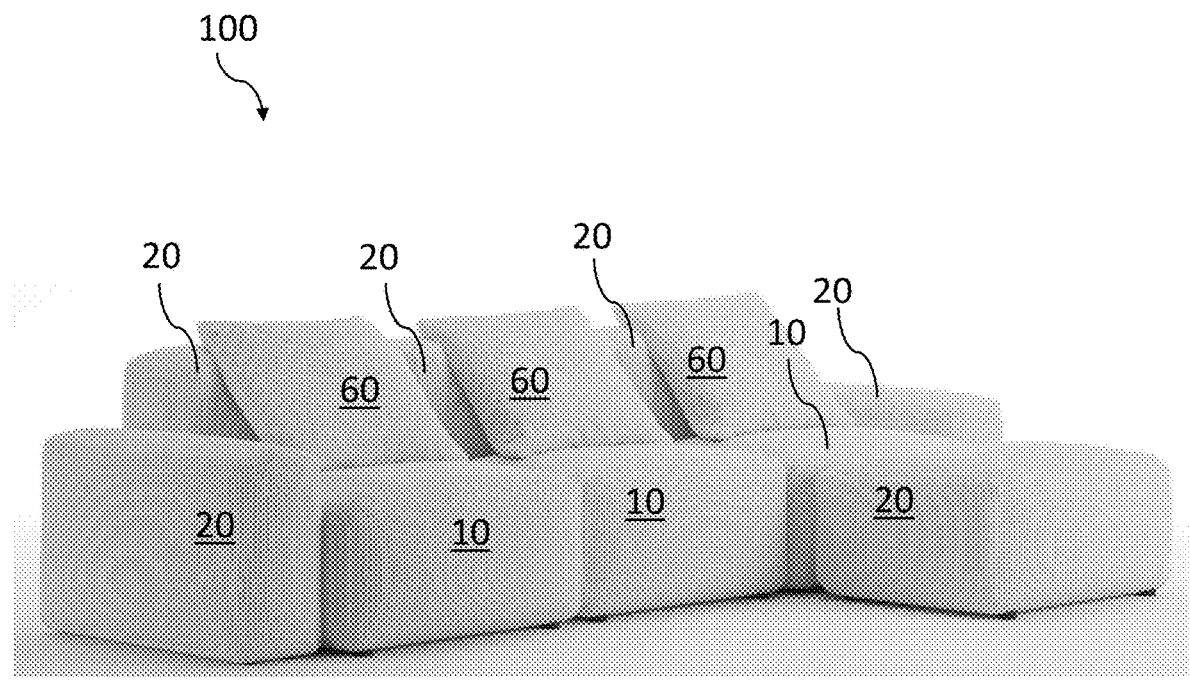

FIGS. 11B-11C illustrate alternative layouts or arrangements of the furniture elements 10 and support elements 20. The voids 14, 24 of each element 10, 20 are indicated by + symbols in FIGS. 11B-11C and the connectors 30 are indicated by bolded lines between the + symbols. FIG. 11D illustrates a furniture system 100 where the connectors (e.g. the projections 31 or caps 50) are acting as legs for the furniture system 100. When the projections 31 are assembled without an inner core 45, a single projection 31 can be used as a leg alone (rather than a leg with a connector). The system can therefore be used to interchangeably form legs and/or leg/connectors as desired, with the same projections used for both legs and/or leg/connectors.

Figure 12A:
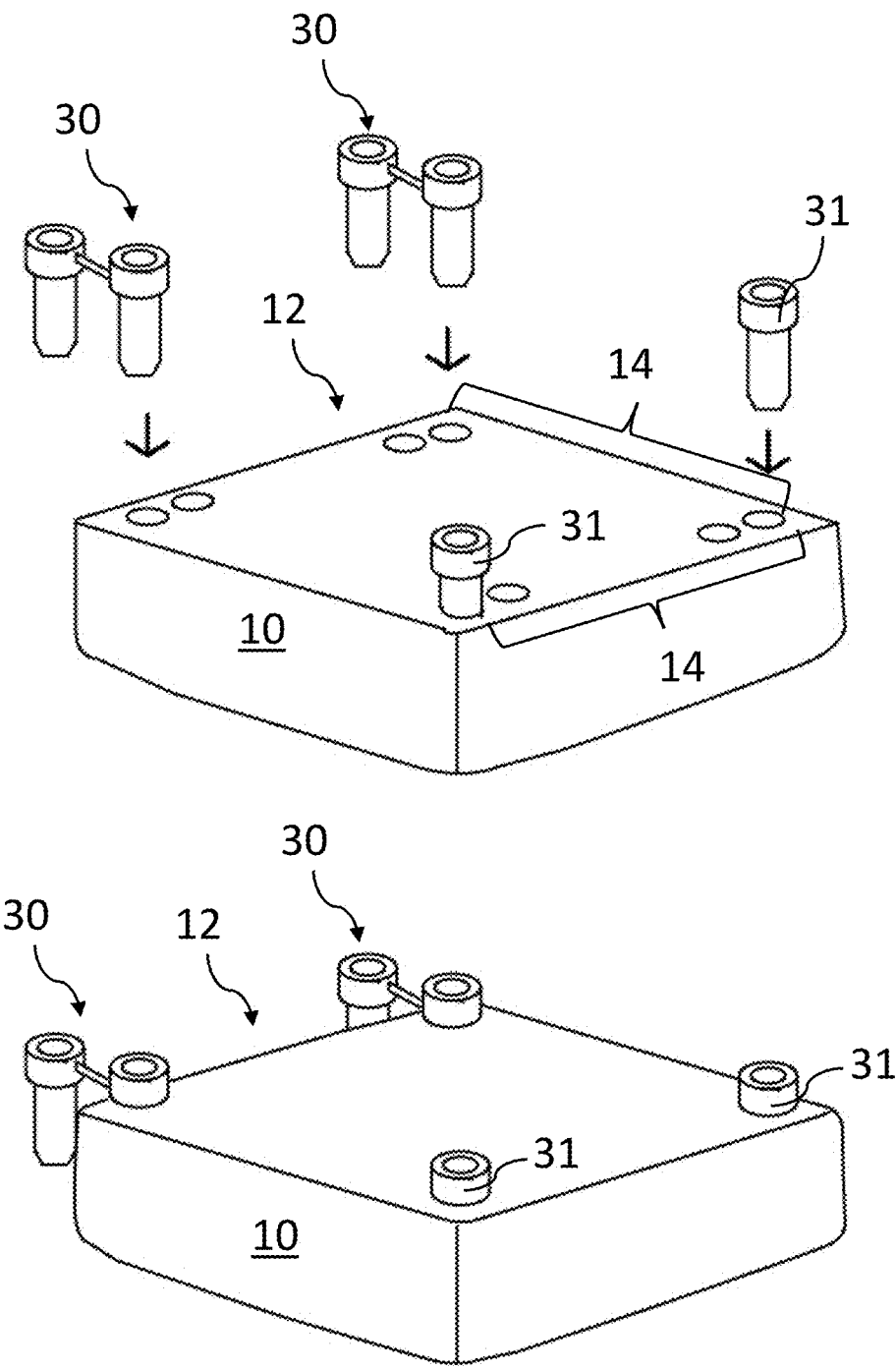
FIGS. 12A-12B schematically illustrate assembly of a furniture system using the connector of FIG. 1.
Figure 12B:
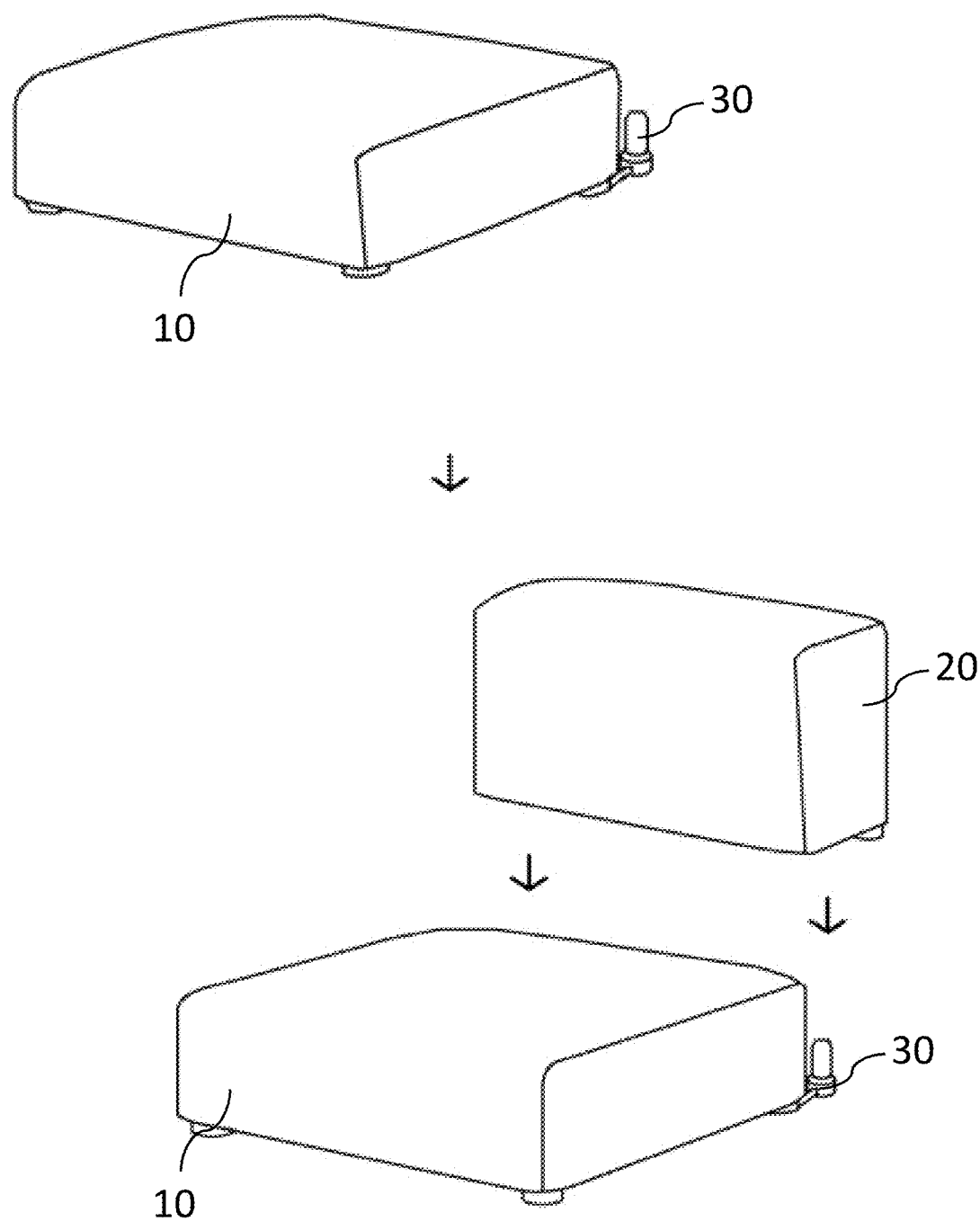

FIGS. 12A-12B schematically illustrate assembly of a furniture system 100 using the connector of FIG. 1. As shown in FIG. 12A, connectors 30 and a few single projections 31 are provided. The single projections 31 may be inserted into voids 14 of a furniture element 10 where no connection to another element (e.g., a support element 20 or another furniture element 10) is needed, such that the single projection 31 can act as legs for the furniture element 10. The connectors 30, specifically the projections 31 of the connectors 30, can also be inserted into voids 14 in order to attach another element (e.g., a support element 20 or another furniture element 10) to the furniture element 10. Once the various projections 31 have been fully inserted into the voids 14, portions of the projections 31 (e.g., the stepped portion 42) are shown sticking out or extending from the voids 14 to act as legs for the furniture element 10.

Referring to FIG. 12B, once the projections 31 and connectors 30 have been inserted into the voids 14, the furniture element 10 may be connected to another element, such as a support element 20. The support element 20 and voids 24 of the support element 20 may be aligned with the free projections 31 of the connectors 30. The support element may then be placed and pushed over the free projections 31 to thereby connect the support element 20 to the furniture element 10. The process may be repeated as necessary to attach a desired number of furniture elements 10 and/or support elements 20 together.

Alternatively, the connectors 30 and projections 31 may first be inserted or attached to a support element 20 and a furniture element 10 may then be connected to the support element 20. It is not required to flip either the furniture element 10 or the support element 20 over to insert the connectors 30 and/or projections 31; the elements 20, 10 may simply be lifted to insert the connectors 30 and/or projections 31 as appropriate.

Figure 13:
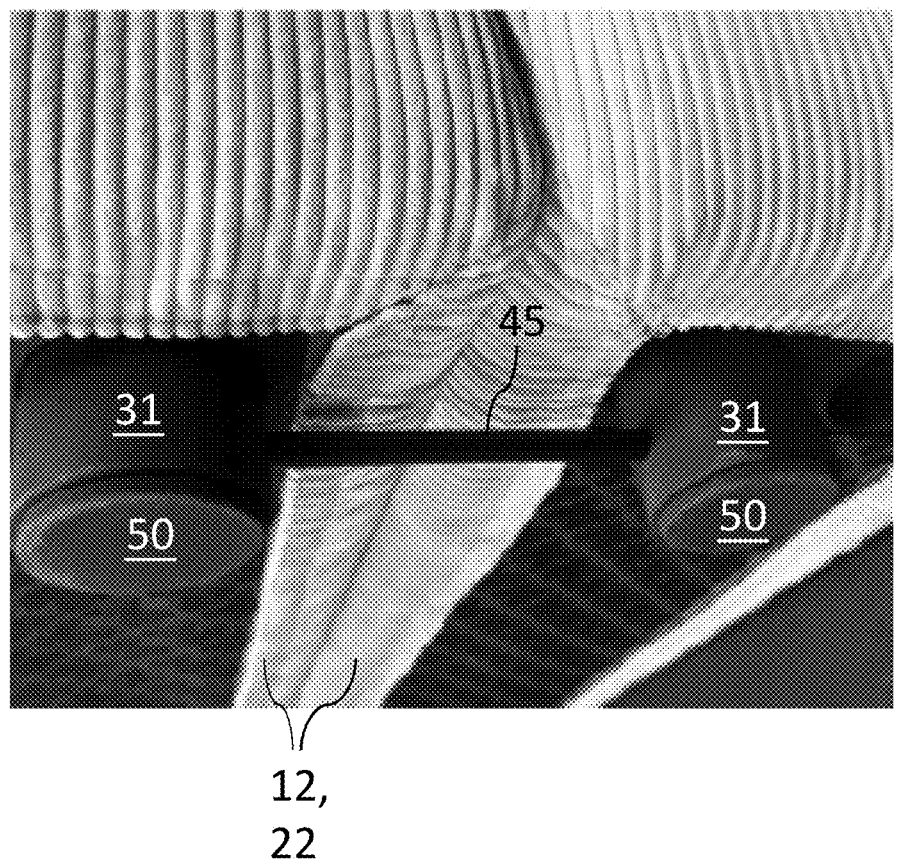
FIG. 13 illustrates a close-up view of a connector received within a furniture piece.

FIG. 13 illustrates a close-up view of the connector 30 received within a furniture piece. As clearly seen, a portion of the projection 31 abuts the bottom surface 12, 22 of the furniture piece, which may be furniture element 10 or a support element 20. The projection 31 is also illustrated as having received the cap 50, which may ultimately rest against the surface (typically the floor) the furniture piece is positioned on. Also visible is the inner core 45 extending from the first projection 31 to a free projection 31, which is ready to receive another furniture piece (e.g., a furniture element 10 or a support element 20).

Figure 14:
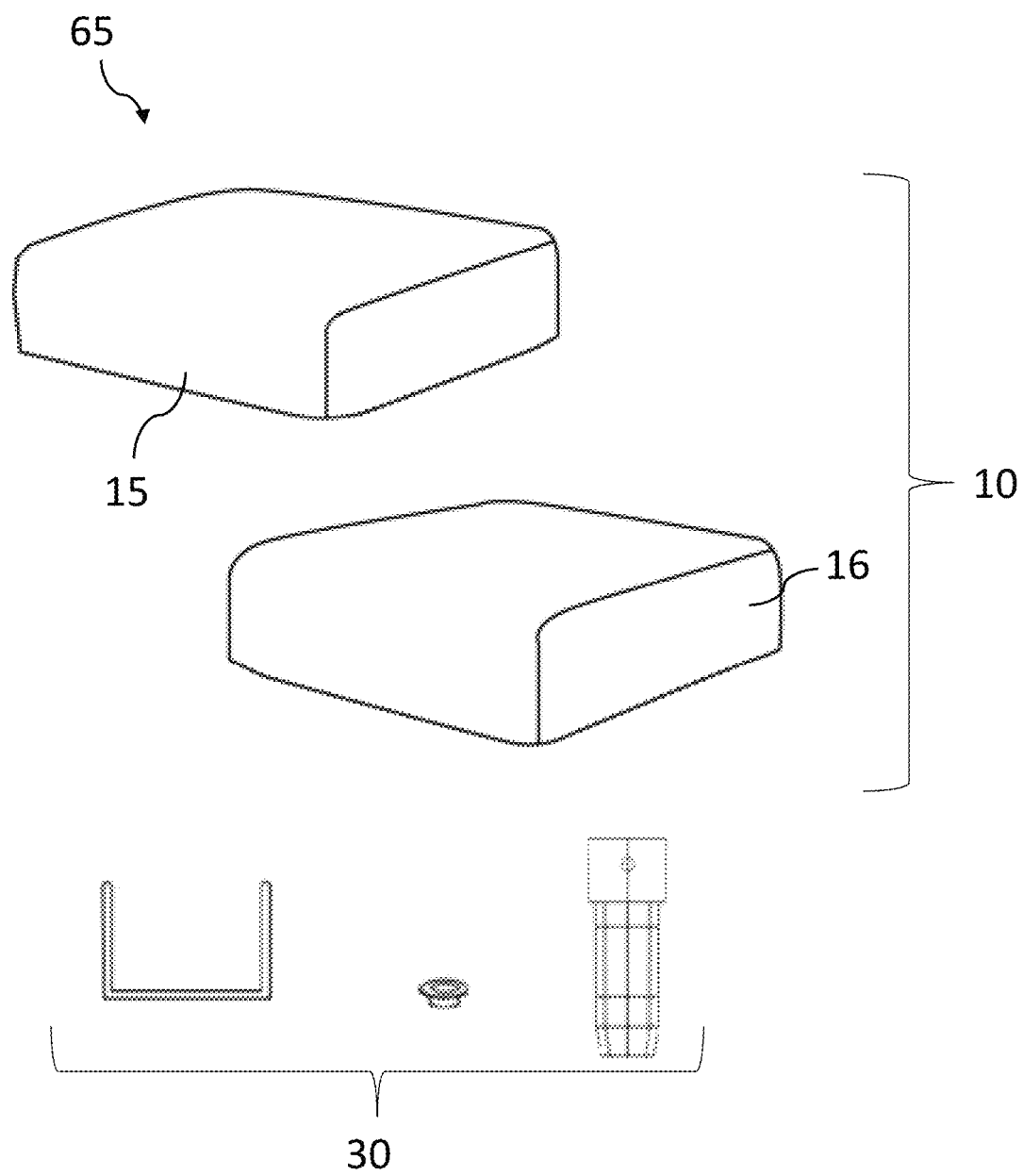
FIG. 14 illustrates a kit for modular furniture.

FIG. 14 illustrates a kit 65 for modular furniture. In one embodiment, a kit 65 may include a cover 15 to receive an inner cushion or body 16. Together, the cover 15 and inner body 16 may create a furniture element 10. Alternatively, the cover 15 and inner body 16 may create a support element 20. The kit also includes the components for the connector 30, such as inner cores, projections halves, and caps.

In some embodiments, the kit does not include any tools, such as screw drivers or drills. Rather, as explain elsewhere, the halves for the projection 31 of the connector 30 simply need to be snapped around prongs of the inner core, thus creating the connector(s) 30. Once assembled, the connectors 30 may be used to modularly link furniture and support elements together to create a furniture system 100.

Figure 15:
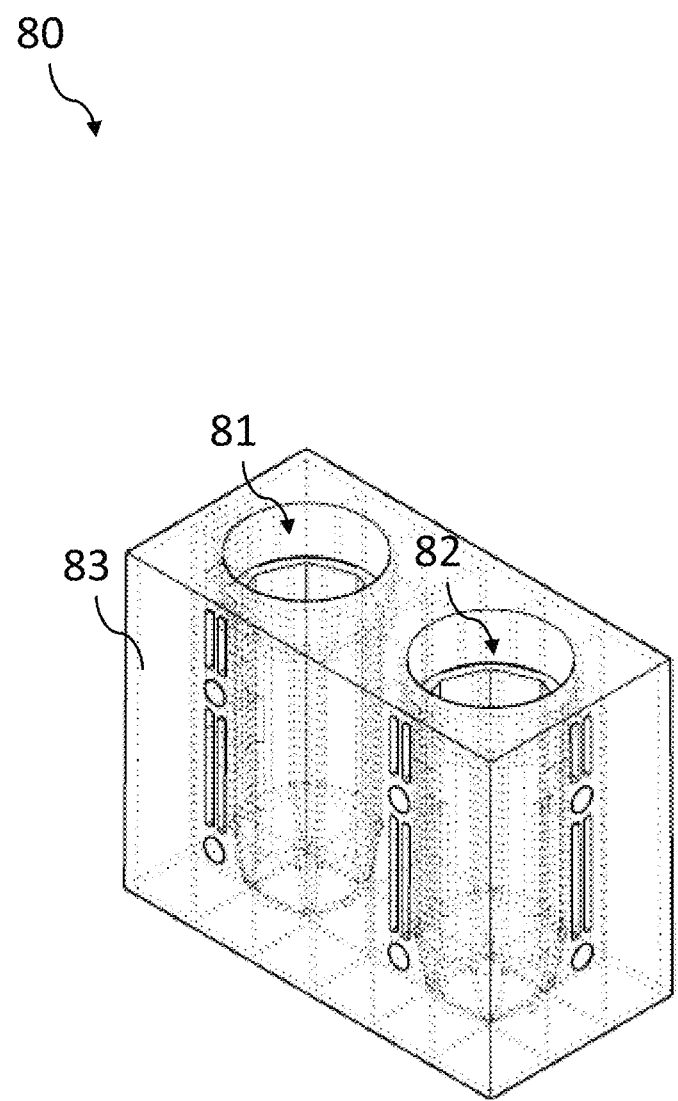
FIG. 15 illustrates a mold for making the projection for the connector.

FIG. 15 illustrates a mold 80 for making the projections 31 for the connector 30. The mold 80 may include a body 83 defining a first cavity 81 and a second cavity 82. The first and second cavities 81, 82 receive molten plastic, thermoplastic, acrylic, etc. in an injection molding process to form the projections 31. Alternatively, each cavity 81, 82 may be shaped to a corresponding half 35, 37 of the projections 31. For example, the first cavity 81 may define a plurality of voids (e.g., voids 38) to create the first half 35 and the second cavity 82 may include a plurality of pins (e.g., pins 36) to create the second half 37. The molded halves 35, 37 (or projections 31) may be removed from the molds 80 and (i) assembled or (ii) incorporated into kits 65.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular furniture element (e.g., a seat or cushion); however, other elements (e.g., ottomans, chairs, etc.) are also contemplated. Structures close to the bottom of furniture elements or that rest on a surface, such as a floor, are referred to as more "distal" while structures that extend through and into the furniture elements are more "proximal." A proximal end or side of a projection 31 is received by the furniture element and a distal end or side of the projection 31 rests on the floor.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A modular furniture system comprising:
   a first seating element having a cushioned top surface and a plurality of voids disposed on a bottom surface of the first seating element;
   a support element connectable to the first seating element and having a plurality of voids disposed on a bottom surface of the support element, the support element for supporting a user resting on the first seating element; and
   a connector for connecting the first seating element and the support element, the connector comprising:
      a substantially U-shaped inner core having a first prong connected to a second prong,
      a first projection disposed about the first prong, the first projection comprising:
         a first half having a plurality of pins and a channel defined in an inner side of the first half,
         a second half having a plurality of apertures for receiving the plurality of pins of the first half and a channel defined in an inner side of the second half, and
         a cap received by a distal end of the first projection in an assembled state,
         wherein the channel of the first half and the channel of the second half together define a conduit for receiving the first prong of the substantially U-shaped inner core, and
      a second projection disposed about the second prong, the second projection comprising:
         a first half having a plurality of pins and a channel defined in an inner side of the first half,
         a second half having a plurality of apertures for receiving the plurality of pins of the first half and a channel defined in an inner side of the second half, and
         a cap received by a distal end of the second projection in an assembled state,
         wherein the channel of the first half and the channel of the second half together define a conduit for receiving the second prong of the substantially U-shaped inner core,
      wherein the first projection is received by one of the plurality of voids of the first seating element and the second projection is received by a void at a bottom surface of the support element, and
      wherein the first and second projections function as first and second legs for the first seating element and the support element.

2. The modular furniture system of claim 1, further comprising a second seating element and a second connector for connecting the second seating element to the first seating element.

3. The modular furniture system of claim 1, wherein the first projection has a length ranging from about 165 mm to about 180 mm.

4. The modular furniture system of claim 1, wherein the second projection has a length ranging from about 165 mm to about 180 mm.

5. The modular furniture system of claim 1, wherein the distal end of the first projection comprises an annular cavity to receive an annular extension of the cap.

6. A furniture system comprising:
a first seating element having a cushioned top surface and a plurality of voids disposed on a bottom surface of the first seating element;
a support element connectable to the first seating element and having a plurality of voids disposed on a bottom surface of the support element; and
a connector for connecting the first seating element and the support element, the connector comprising:
an inner core having a first prong and a second prong,
a first projection disposed about the first prong, the first projection comprising a first half connectable to a second half, the first and second halves defining an inner conduit to receive the first prong, and
a second projection disposed about the second prong,
wherein the first projection is received by one of the plurality of voids of the first seating element and the second projection is received by one of the plurality of voids of the support element, and
wherein the first and second projections function as first and second legs for the first seating element and the support element.

7. The furniture system of claim 6, wherein the support element comprises a back rest.

8. The furniture system of claim 6, wherein the support element comprises an arm rest.

9. The furniture system of claim 6, wherein the support element comprises a second seating element.

10. The furniture system of claim 6, wherein the support element comprises an ottoman.

11. The furniture system of claim 6, wherein the inner core is substantially U-shaped and the first prong is separated from the second prong by a distance of about 180 mm to 200 mm.

12. The furniture system of claim 6, wherein the second projection comprises a first half connectable to a second half, the first and second halves defining an inner conduit to receive the first prong.

13. The furniture system of claim 6, further comprising a second seating element connectable to the first seating element and a second connector for connecting the second seating element to the first seating element.

14. A connector for modular furniture comprising:
a substantially U-shaped core having a first prong and a second prong;
a first extension disposed about the first prong, the first extension comprising:
a first half having a plurality of pins and a channel defined in a back side of the first half;
a second half having a plurality of apertures for receiving the plurality of pins of the first half and a channel defined in a back side of the second half; and
a cap received by a distal end of the first extension,
wherein the channel of the first half and the channel of the second half together define a conduit for receiving the first prong of the substantially U-shaped core;
a second extension disposed about the second prong;
wherein the connector is configured to attach a first furniture piece to a second furniture piece, and
wherein the connector is capable of being legs for the modular furniture, the first furniture piece, and/or the second furniture piece.

15. The connector of claim 14, wherein the first extension has a length ranging from about 165 mm to about 180 mm, the length being measured from the distal end to a proximal end of the first extension.

16. The connector of claim 15, wherein the proximal end of the first extension is received by a furniture element, and the distal end of the first extension is a leg for the furniture element.

17. The connector of claim 14, wherein the distal end of the first extension comprises a channel to receive the cap.

* * * * *